United States Patent [19]

Nishizawa et al.

[11] 3,829,885

[45] Aug. 13, 1974

[54] CHARGE COUPLED SEMICONDUCTOR MEMORY DEVICE

[75] Inventors: Junichi Nishizawa, Sendai; Terumoto Nonaka, Shizuoka, both of Japan

[73] Assignee: Zaidan Hojin Handotai Kenkyu Shinkokai, Sendai-shi, Miyagi-ken, Japan

[22] Filed: Oct. 12, 1972

[21] Appl. No.: 296,875

[52] U.S. Cl. ....................357/24, 357/63, 357/304

[51] Int. Cl. .......................................... H01l 11/14

[58] Field of Search.. 340/173 CH, 173 FF, 173 LS; 307/304, 238; 317/235 B, 235 G, 235 N, 235 AQ, 235 AQ, 234 UA

[56] References Cited

UNITED STATES PATENTS

| | | | |
|---|---|---|---|
| 3,407,394 | 10/1968 | Hartke | 340/173 LS |
| 3,449,644 | 6/1969 | Nassibian | 317/275 |
| 3,654,499 | 4/1974 | Smith | 317/235 |
| 3,654,531 | 4/1972 | Krambeck et al. | 317/235 |

OTHER PUBLICATIONS

Applied Physics Letters, "Observation of the Ideal Generation – Recombination . . . "by Sah et al., May 1969, pages 267–269.

*Primary Examiner*—Jerry D. Craig
*Attorney, Agent, or Firm*—Craig & Antonelli

[57] ABSTRACT

A charge coupled device has gold-containing regions in portions adjacent to the surface of an N type Si substrate being in contact with a $SiO_2$ film and corresponding to electrodes disposed separately on the $SiO_2$ film. Holes introduced into the Si substrate are trapped in the gold-containing regions by the application to the electrodes, of an electric field having strength sufficient to produce an inversion region in the Si substrate, that is a P type region, in at least a part of the gold-containing regions within the Si substrate, so that the holes can be advantageously memorized for a long period of time, e.g., many hours, without applying an electric field to the charge coupled device.

27 Claims, 10 Drawing Figures

CHARGE COUPLED SEMICONDUCTOR MEMORY DEVICE

This invention relates to a charge coupled device, and, more particularly to a charge coupled semiconductor device capable of memorizing charged carriers for a long period of time.

Charge coupled semiconductor devices have attracted attention because of their simplicity in construction, the easiness of their fabrication, and their applications such as shift registers, image devices, and display devices.

Conventional charge coupled devices have MIS (Metal-Insulator-Semiconductor) construction which is well known in the art. Typically, such a device comprises a semiconductor substrate, a thin insulating film disposed on one main surface of the semiconductor substrate, means for introducing electric charge carriers into the semiconductor substrate, electrodes separately disposed on the insulating film for storing the electric charge carriers, introduced into said substrate and transferring the carriers along the surface of the semiconductor substrate adjacent to the insulating film, means connected to the electrodes for applying an electric field for transferring the carriers to the semiconductor substrate, and means for detecting the carriers thus transferred.

As the electric charge carriers, minority carriers in the semiconductor substrate are used because the semiconductor is suitable for the generation of the carriers. That is, when the semiconductor substrate is of N type, holes are used, and when the substrate is of P type, electrons are used.

The charge coupled device functions in the following manner.

First, a DC voltage is applied to one of the electrodes on the insulating film in such a manner that a depletion region is produced in the surface portion of the semiconductor substrate in contact with the insulating film and between that particular electrode and a portion in the substrate corresponding to the electrode. Since the depletion region is formed only in the substrate surface portion immediately below the electrode, a potential well is formed thereat.

In this state, minority carriers are injected into the semiconductor substrate by an application of a forward voltage to the P-N junction, induction of an avalanche in a MOS (Metal-Oxide-Semiconductor) structure, or irradiation with radiant rays or light. These minority carriers are then collected in the potential well.

Next, a DC voltage, greater than the voltage already applied on the first electrode, is applied to an electrode adjacent to the first electrode with the consequence that a deeper potential well is formed thereunder. Because of their general tendency to move into a deeper well, the minority carriers do so upon the application of the greater DC voltage as described above. After the transit of the minority carriers, the DC voltage applied to the first electrode is cut off and the voltage on the second electrode is reduced to a level equal to the voltage for the first electrode. In this way the minority carriers originally collected immediately below the first electrode are completely transferred to the potential well under the next electrode.

By repeatedly applying DC voltages in the manner described above it is possible to transfer the minority carriers from electrode to electrode.

The fundamental structures and principles of charge coupled semiconductor devices are described in detail, for example, in *Charge Coupled Semiconductor Devices* by W. S. Boyle and G. E. Smith, the Bell System Technical Journal, Vol. 49, No. 4 (April, 1970), pp. 587–593.

If the minority carriers introduced into a semiconductor substrate are utilized as a medium for indicating or displaying information, then such a device will have possible applications as a shift register, image device, display device, etc. Also, if those carriers can be stored for a long period of time, the structure will have a possibility as a memory device.

In a conventional charge coupled semiconductor device, the minority carriers are stored in the semiconductor substrate portion immediately below an electrode, and the storage time is equal to the period of time required for the thermal carriers present in the semiconductor substrate to fill up the potential well, that is, a period of several seconds. Although the storage time can be slightly extended by using a semiconductor substrate having a large energy gap, the extension is again several seconds at most. Thus, if the minority carriers are to be retained as information for a period longer than several seconds, some other method has to be employed. For example, the apparent storage time may be increased by causing the minority carriers to move from electrode to electrode within the charge coupled device. This means that a shift register is simply used as a memory device.

Such an attempt to prolong the storage time has a drawback, however, in that the minority carriers cannot be 100 percent transferred from the portion of the semiconductor substrate immediately below a certain electrode to another substrate portion under an adjacent electrode and consequently, the loss of the minority carriers is increased or, stated differently, there is that possibility of information being displayed inaccurately.

Moreover, minority carriers in the semiconductor substrate constituting an ordinary charge coupled device disappear upon the cut-off of the application of the electric field and, therefore, it is impossible to use such a charge coupled device as a non-volatile memory.

The present invention provides a novel charge coupled device which overcomes the foregoing difficulties.

It is an object of the invention to provide a charge coupled device capable of storing minority carriers for a long period of time in the portion of a semiconductor substrate immediately under a certain electrode.

Another object of the invention is to provide a charge coupled device capable of storing minority carriers for a long period of time after an applied electric field has been cut off.

These objects of the present invention are realized by providing an impurity region having a deep energy level in the semiconductor substrate at least in the surface portion of the semiconductor substrate in contact with an insulating film and corresponding to the electrode under which the minority carriers are to be stored and connecting means for applying an electric field having a strength sufficient to invert the conductivity type of at least a part of the impurity region, to at least one of the electrodes corresponding to the portion where the minority carriers are to be stored.

The additional objects and advantages of this invention will become apparent from the following description when taken in conjunction with the accompanying drawings, wherein:

FIGS. 1*a* to 1*c* show in longitudinal section, explanatory views of the principles of the present invention;

The present invention is predicated upon the discovery, as a result of our analysis that, if a strong electric field is applied to an impurity region having a deep energy level in a semiconductor substrate, the carriers in the substrate are then trapped in this region.

For a better undertanding of the present invention, the embodiments thereof will be described hereunder with the semiconductor substrates of N type only, that is, the minority carriers are limited to holes. However, it should be understood, of course, that semiconductor substrates of P type, that is, minority carriers in the form of electrons, may be used as well.

As already noted, this invention provides a device comprising, as its fundamental components, a semiconductor substrate, an insulating film disposed on the substrate surface, an electrode disposed on the insulating film, and an impurity region disposed in the portion of the semiconductor substrate in contact with the insulating film corresponding to the electrode and so doped as to provide a deep energy level in the forbidden gap of the semiconductor substrate.

Figure 1A:
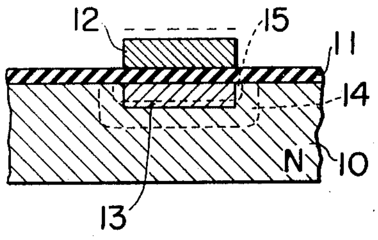

The principles of the invention will now be explained with reference to FIGS. 1*a* through 1*c*.

Throughout these figures, which illustrate the above-mentioned fundamental components, the reference numeral 10 indicates an N type Si substrate, 11 an insulating film, 12 a metallic electrode, and 13 an impurity region.

If it is assumed that a negative electric field is applied to the Si substrate 10 via the metallic electrode 12, a depletion region 14 will be formed within the substrate. The larger the electric field applied, the more extensively the depletion region will grow until an inversion region 15 is formed which is opposite in the type of conductivity to the substrate 10.

It has now been found that the impurity region 13 having the deep energy level traps the carriers, not in the depletion region 14, but in the inversion region 15 and that the carriers, once trapped, will be stored for a long period of time even after the application of the electric field has been discontinued.

Figure 1B:
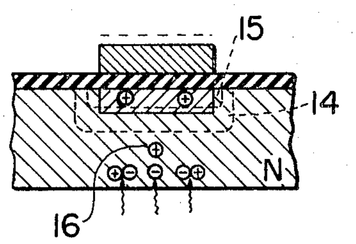
Figure 1C:
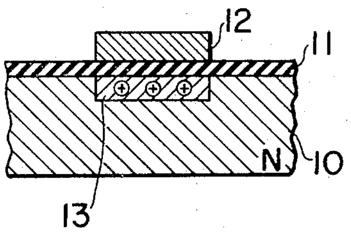

Therefore, if an electric field having a strength sufficient to produce an inversion region, that is, a P type region 15, is applied to the N type Si substrate 10 via the metallic electrode 12 and minority carriers, that is, holes 16 are injected from the outside as shown in FIG. 1*b*, then the holes 16 will be attracted and moved toward the metallic electrode 12 by the electric field and will finally reach the impurity region 13 in the inversion region 15 and be trapped in the region 13. As shown in FIG. 1*c*, the trapped holes remain trapped in the impurity region 13 even after the inversion region 15 and the depletion region 14 have disappeared from the N type Si substrate 10 upon removal of the electric field.

The period of time for which the holes continue to be trapped in the impurity region, that is, the storage time of the minority carriers, varies with the material that constitutes the semiconductor substrate, the impurities forming the impurity region, and the ambient temperature, but is much longer than the storage time in the afore-mentioned charge coupled device, which is several seconds. For example, with a semiconductor substrate of Ge or Si and an impurity of Au in the impurity region, the minority carriers will be trapped for several minutes at an ordinary temperature (ab. 25°C) and for several tens of days at the temperature of liquified nitrogen. When the semiconductor substrate is GaAs and the impurity is Cr, the minority carriers will be trapped for several hours at ordinary temperatures and for several years at the temperature of liquified nitrogen.

Useful impurities, aside from Au, are those which are capable of attaining a deep energy level in the forbidden gap of a semiconductor substrate; they include Ag, Cu, Ni, Fe and Co for substrates of Si and Ge, and Cr may be used for the GaAs substrate, as well as the above-mentioned impurities for Si. It has been experimentally confirmed by us that, of the impurities mentioned above, Au is the most preferable impurity for Si, and Cr is the most suitable for GaAs.

As already pointed out, carriers are trapped in the impurity region when a sufficiently strong electric field to produce an inversion region in at least a part of the impurity region is applied to the semiconductor substrate. They are not trapped, however, when the semiconductor substrate is exposed to an electric field which is only strong enough to create a depletion region in the substrate. Therefore, it is possible to effect the carrier transfer in the same way as in a conventional charge coupled device and store the carriers for a lengthy period of time by controlling the strength of the electric field that is applied to the impurity region of the semiconductor substrate.

Figure 2:
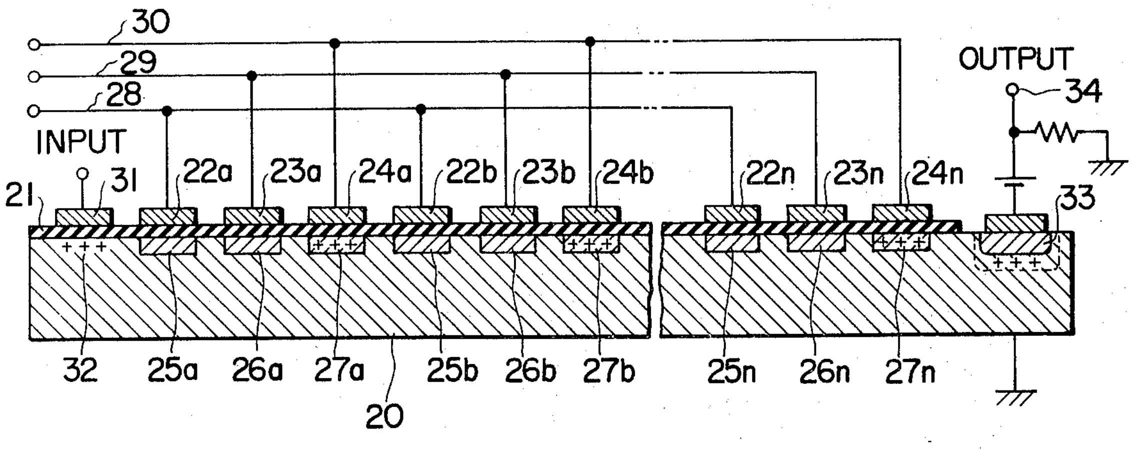
FIG. 2 is a longitudinal sectional view illustrating an embodiment of the invention.

FIG. 2 is a view illustrative of an embodiment of the present invention, which is essentially composed of the units each of which has been described in connection with FIGS. 1*a* through 1*c*.

An N type Si substrate 20 is covered on one main surface with an insulating film 21, and a series of electrodes 22*a–n*, 23*a–n*, 24*a–n* are disposed over the insulating film 21. These electrodes are arranged in trios of 22*a*, 23*a*, 24*a* up to the last trio of 22*n*, 23*n*, 24*n*. In the portions of the semiconductor substrate 20 in contact with the insulating film 21 and corresponding to the individual trios of the electrodes 22*a–n* to 24*a–n* that is, in the substrate surface portions opposite to the electrodes 22*a–n* to 24*a–n*, there are disposed impurity regions 25*a–n* to 27*a–n* of Au. Conductors 28, 29, 30 are respectively connected to every third electrode. In the embodiment shown, the input, that is, minority carrier generating means, indicated at 31, is an MIS element which is driven to avalanche. The minority carriers 32, produced at the generating means 31 move along the surface of the Si substrate 20 when an electric field of such strength which does not produce an inversion region, but creates only a depletion region, in the Si substrate 20, is applied to the substrate in a well timed relationship through the conductors 28, 29,30 and the electrodes 22*a–n*, 23*a–n*, 24*a–n*. The carriers are extracted from an output terminal 34 via a reversely biased P-N junction 33.

Means for generating the minority carriers, the means and method for transferring carriers, and the means and method for extracting them may be the same as those adopted for the conventional charge coupled devices. A particularly useful means and method are disclosed in U.S. Pat. application No. 11,541 assigned to Bell Telephone Laboratories, Inc.

The minority carriers travelling along the surface of the Si substrate 20 can be stored in the impurity regions immediately below desired electrodes when an electric field having a strength sufficient to product inversion regions in at least a part of the individual impurity regions within the Si substrate 20 is applied to the substrate via a desired conductor and electrodes.

Assuming now that an electric field having a strength sufficient to form depletion regions within the Si substrate 20 is applied to the conductors 28, 29 and an electric field having a strength sufficient to produce inversion regions in at least a part of the impurity regions within the substrate is applied to the conductor 30, the minority carriers then being transferred along the Si substrate surface portions immediately below the series of electrodes 22*a*, 22*b*, . . . 22*n* go through the Si substrate surface portions immediately below the series of electrodes 23*a*, 23*b*, . . . 23*n* to reach the Si substrate surface portions immediately under the series of electrodes 24*a*, 24*b*, . . . 24*n*. Since an electric field having a strength sufficient to produce an inversion region in at least a part of the impurity regions within the Si substrate 20 is applied to Si substrate surface portions immediately below the series of electrodes 24*a*, 24*b*, 24*n*, as already stated, the impurity regions 27*a*, 27*b*, . . . 27*n* have inversion regions, that is, P type regions in at least the corresponding surface portions of the Si substrate. Accordingly, the minority carriers, that have transmitted to the inversion regions of the impurity regions along the Si substrate surface, are trapped by the impurity regions and are no longer transferred to the electrodes 25*b*, . . . 25*n* and the extracting means. In other words, the minority carriers are stored in the impurity regions 27*a* 27*b*, . . . 27*n*.

The minority carriers stored in this manner continue to be stored for a long period of time, e.g., for several minutes, after the application of the electric field to the Si substrate 20 has been cut off. This means that the information thereby stored can be read out as long as the minority carriers are in storage.

The reading-out of the minority carriers from the storage can be accomplished either while maintaining the carriers in the stored state or by breaking the stored state.

In the embodiment under consideration, an N type Si substrate having a specific resistance of about 5Ω-cm and a dielectric film of $SiO_2$ about 2,000 A in thickness was used. The substrate was doped with about $5 \times 10^{14}$ $cm^{-3}$ of Au to form the impurity regions. In order to generate minority carriers an electric field of about $4 \times 10^5$ V/cm was applied to the electrode 31. To transfer the minority carriers an electric field of about $5 \times 10^3$ V/cm was applied to the electrodes 22, 23, 24 in a timed relationship. Further, an electric field of about $2 \times 10^4$ V/cm was applied to the electrodes 24 to thereby permit storage of the minority carriers in the impurity regions.

When the minority carriers are stored in the impurity regions 27*a*, 27*b*, . . . . 27*n* and the stored carriers are to be extracted in succession from the output terminal 34 as illustrated in FIG. 2, an electric field having a strength sufficient to produce depletion regions in the Si substrate 20, is applied through the conductors 28, 29, 30, that is, a pulse electric field is applied to the conductors 28 to 30 in a timed relationship, so that the minority carriers can be transferred, while an electric field, having a strength sufficient to cause an avalanche, is applied by another field applying means to the impurity regions 27*a*, 27*b*, . . . 27*n*, wherein the minority carriers are stored. In this way, the minority carriers are driven out of the impurity regions 27*a*, 27*b*, . . . 27*n*, transferred forward by the electrodes 22, 23, 24 and are drawn out in succession from the output terminal 34. In the experiment the field intensity that was required to induce the avalanche was about $4 \times 10^5$ V/cm.

In this case, however, the storage condition of the minority carriers in the impurity region is destroyed.

Figure 3:
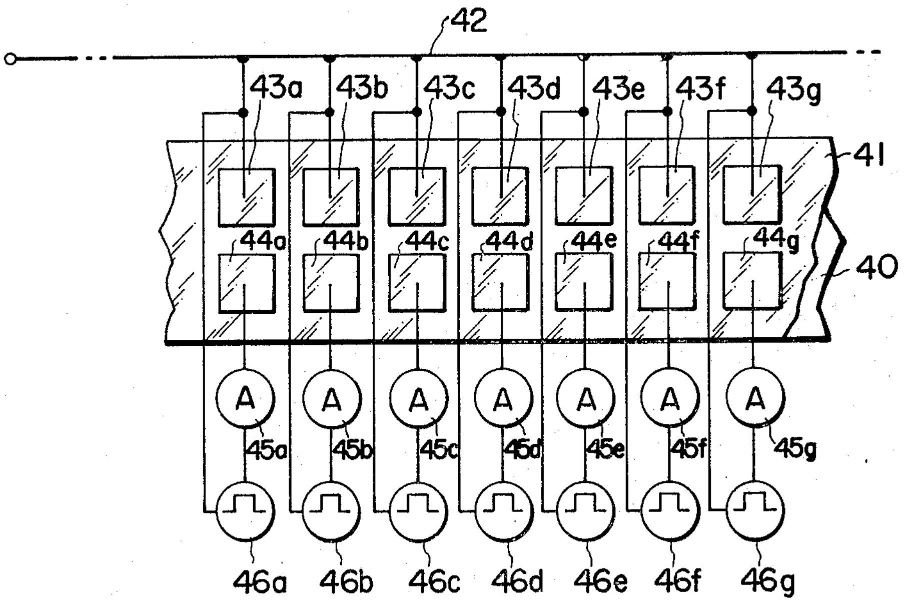
FIG. 3 is a view illustrating another embodiment for detecting minority carriers stored in accordance with the invention.

If the minority carriers, as stored, are to be read out while they are being stored in the impurity regions, the present invention may be embodied as illustrated in FIG. 3.

FIG. 3 shows an embodiment which permits non-destructive read-out. It differs from the embodiment of FIG. 2 in that a pulse electric field for the transfer of the minority carriers is applied to a semiconductor substrate 40 via a time delay line 42 and electrodes 43, thus reducing the number of electrodes required for the transfer purpose to one third as many as in the embodiment of FIG. 2, and that electrodes 44 for reading out the stored carriers which correspond in number to the transfer electrodes 43 are disposed close to the latter. Numeral 41 in the figure indicates an insulating film corresponding to the film 21 of the embodiment shown in FIG. 2.

The individual electrodes 43 for transfer purpose are connected to the corresponding read electrodes 44 via ammeters 45 and read pulse generating means 46.

If read pulses from the pulse generating means 46 are applied between the electrodes 43, 44, the deflections of the ammeters 45 vary with the amounts of the minority carriers in the impurity regions. If the amounts of the minority carriers in the impurity regions are large, large currents flow and the ammeters 45 deviate widely. Conversely if the amounts are small, proportionally small currents flow and the meter deviations are limited. It follows that the amounts of the minority carriers in the impurity regions can be detected in terms of the deviations of the ammeters 45. This read-out can be accomplished while the minority carriers are kept in storage. In the experiment the pulse voltage used has a pulse duration of about 50 n sec. and a pulse height of about − 0.5 V.

Figure 4:
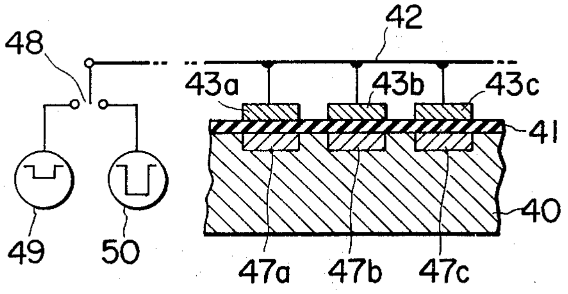
FIGS. 4, 5 and 6 are views illustrating other embodiments for storing minority carriers according to the invention.

FIG. 4 is a view explanatory of another embodiment of the invention for storing minority carriers therein.

This charge coupled device comprises an N type Si substrate 40, an insulating film 41 disposed on one surface of the substrate, a series of electrodes 43*a–c* disposed on the dielectric film 41, and impurity regions 47*a–c* of Au disposed on the surface of the N type Si substrate corresponding to the individual electrodes, the electrodes being connected altogether by a time delay line 42.

Either a pulse electric field intense enough to produce depletion regions or a pulse electric field having a strength sufficient to produce inversion regions in the N type Si substrate 40 is applied through the time delay line 42 and the electrodes 43*a–c*. For this purpose, pulse field generating means 49 capable of producing depletion regions within the N type Si substrate 40 or pulse field generating means 50 capable of creating inversion regions in the substrate is connected to the time delay line 42 through a switch 48.

In an experiment, pulse voltage which could create the depletion regions within the N type Si substrate had a pulse duration of above 500 n sec. and a pulse height of about −0.5 V, with a recurrency frequency of about 1 MHz. The pulse voltage capable of producing the inversion regions had a pulse duration of about 500 n sec. and a pulse height of about − 3 V.

As will be appreciated from the foregoing description, the minority carriers in the N type Si substrate are not stored but are transferred along the substrate surface when the field generating means 49 is connected to the time delay line 42, but they are trapped in the impurity regions 47*a–c* and stored therein when the field generating means 50 is connected, instead, to the time delay line 42.

Figure 5:
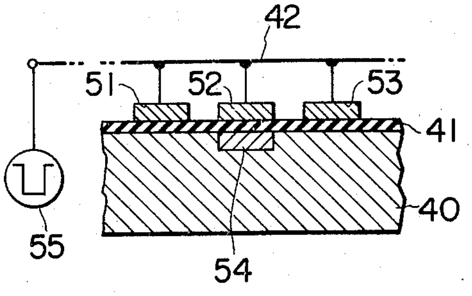

FIG. 5 is a view illustrating another embodiment of the invention for storing minority carriers. An impurity region 54 is disposed only in one portion where the minority carriers are to be stored, and pulse field generating means 55 capable of producing inversion regions within an N type Si substrate 40 is connected to a time delay line 42.

In this device, an inversion region always appears in the surface portion of the semiconductor substrate 40 opposite each electrode. However, the minority carriers are not stored in the substrate surface portions opposite the electrodes 51 and 53 which do not have impurity regions therebelow, but only in the substrate surface portion where there is the impurity region 54.

Figure 6:
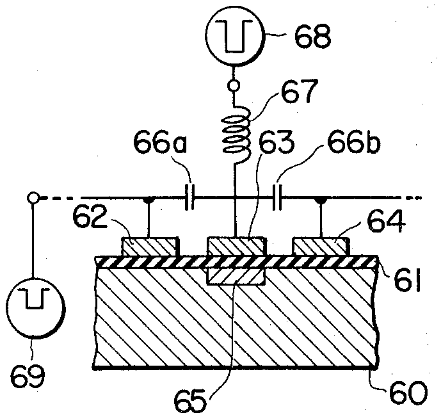

FIG. 6 shows still another embodiment of the invention for storing minority carriers. An impurity region 65 is disposed in only one portion where the minority carriers are to be stored. Electrodes 62, 63, 64 are connected to one another through capacitances 66*a* and *b*, and altogether connected at one end to means 69 for generating a pulse electric field having a strength sufficient to produce depletion regions within the semiconductor substrate. The electrode 63 located opposite the impurity region 65 is connected via an inductance 67 to means 68 for generating a pulse electric field having a strength sufficient to produce the inversion regions within the semiconductor substrate. The reference numerals 60 and 61 indicate a semiconductor substrate and an insulating film, respectively.

Now, if a pulse electric field capable of producing depletion regions in the semiconductor substrate is applied to the electrodes 62, 63 and 64, the minority carriers introduced into the semiconductor substrate 60 are transferred along the substrate surface.

When the minority carriers are to be stored in the impurity region 65, it is only necessary to cause the means for generating the pulse electric field capable of producing inversion regions in the semiconductor substrate to apply an electric field for producing the inversion regions through the inductance 67 to the electrode 63 located opposite the impurity region 65.

The capacitances 66*a* and *b* are used to protect the pulse electric field from the pulse field generating means 69, that is the pulse field for transferring the minority carriers, against the influence of the pulse field from the pulse field generating means 68, that is, the pulse field for storing the minority carriers. Similarly, the inductance 67 is used to protect the pulse electric field for storing the minority carriers from being influenced by the pulse field for transferring the minority carriers.

In the embodiments of the present invention thus far described, the impurity regions are disposed in at least the portions to be memorized of the semiconductor substrate opposite to the electrodes. However, as will be clear from the principles of the invention already explained, the impurity regions may be extended to cover the entire surface of the semiconductor substrate.

Figure 7:
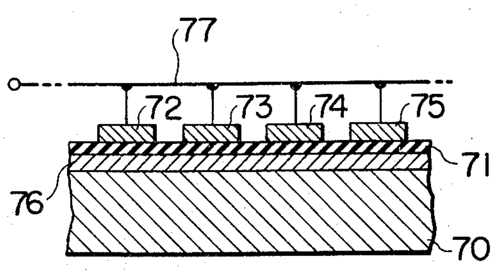
FIG. 7 is a sectional view illustrating still another embodiment of the invention.

FIG. 7 shows yet another embodiment of the present invention having the same structure as that of FIG. 4 with the exception that a continuous impurity region 76 is disposed in the surface portion of a semiconductor substrate 70 in contact with an insulating film 71.

This charge coupled device comprises a semiconductor substrate 70, an insulating film 71 disposed on one surface of the substrate, a series of electrodes 72, 73, 74, 75 disposed on the insulating film 71, and a continuous impurity region 76 disposed in the surface portion of the semiconductor substrate 70 in contact with the insulating film 71. The electrodes are connected to a common time delay line 77. This charge coupled device works in the same way as in the embodiment of FIG. 4.

Figure 8:
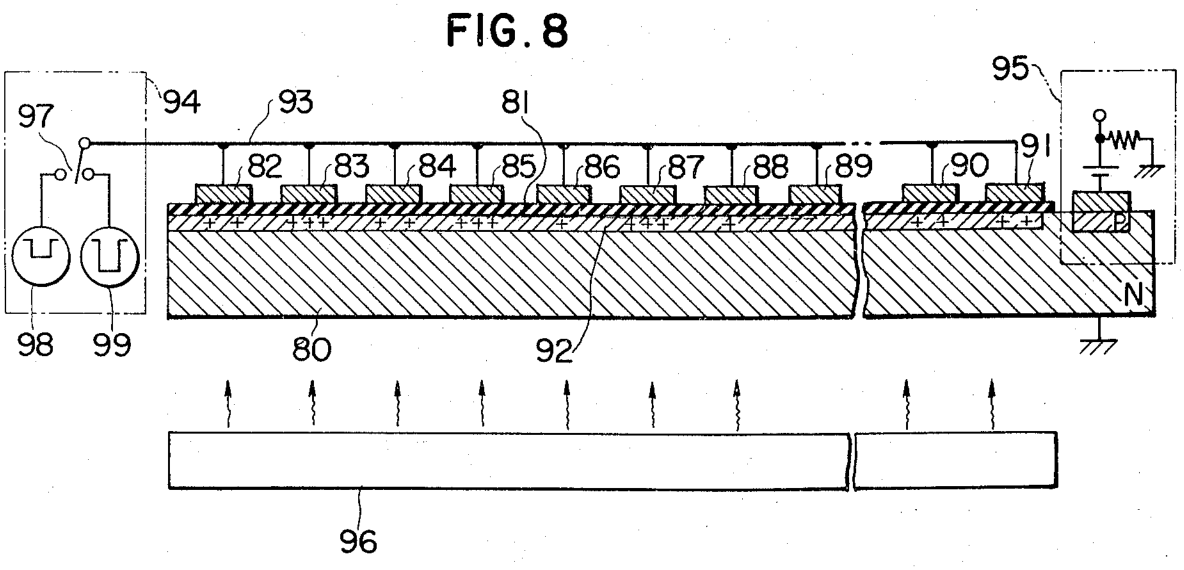
FIG. 8 is a sectional view of a further typical embodiment of the invention.

FIG. 8 shows an image transcription device having a memorizing function, which is an embodiment of the present invention having most encouraging prospects.

This image transcription device comprises a semiconductor substrate 80, an insulating film 81 disposed on one surface of the substrate, a series of electrodes 82, 83, 84, . . . 91 disposed on the surface of the insulating film 81, a continuous impurity region disposed in the surface portion of the semiconductor substrate 80 in contact with the insulating film 81, a time delay line 93 connecting the series of electrodes 82, 83, . . . 91, electric field applying means 94 connected to one end of the time delay line, light signal applying means 96 for generating minority carriers corresponding to the intensity of a light signal that is applied within the semiconductor substrate 80, and minority carrier detecting means 95 disposed opposite to the last electrode 91 of the series of electrodes, for detecting the minority carriers generated by said light signal. The electric field applying means 94 consists of the components as described in conjunction with the embodiment of FIG. 4, that is, a switch 97, means 98 for applying a pulse electric field having a strength sufficient to produce depletion regions within the semiconductor substrate 80 and means 99 for applying a pulse electric field having a strength sufficient to produce inversion regions within the substrate.

It is now assumed that a pulse electric field from the means 98 for applying a pulse field capable of producing depletion regions within the semiconductor substrate 80 is applied first to the semiconductor substrate 80 via the switch 97, time delay line 93 and the series of electrodes 82, 83, 84, . . . 91. Next, the semiconductor substrate 80 is exposed to light from the light signal applying means 96. Then, depending upon the intensity of the light signal, hole-electron pairs are formed within the semiconductor substrate 80, and the minority carriers are attracted by the electrodes. The minority carriers are transferred by the series of electrodes toward the last electrode 91 to be detected in succession by the minority carrier detecting means 95. Thus, because the minority carriers corresponding to the intensity of the light signal from the light signal applying means 96 are detected by the detecting means 95, this charge coupled device can serve effectively as an image transcription device.

If a certain image is to be memorized, it is only necessary to change the switch 97, so that the means 99 for applying a pulse electric field capable of producing inversion regions in the semiconductor substrate is connected to the time delay line, thereby forming inversion regions within the portions of the semiconductor substrate 80 immediately below the series of electrodes 82, 83, 84, . . . 91 and enabling the minority carriers to be trapped and stored in the inversion regions of the impurity region 92. After the semiconductor substrate 80 has been irradiated with the light signal to be memorized, sufficient care must be taken to avoid the incidence of any other light signal upon the substrate surface.

The minority carriers stored in this way, that is, the memorized image, can be read out, as already described, either while in storage or by destroying the memorized state.

When the image is to be read out, while being memorized, a device as embodied in FIG. 3 is preferably used, but other methods, for example, a method of determining the amount of light transmission through or reflection by the semiconductor substrate portions immediately below the individual electrodes may be employed as well.

While the invention has been explained in detail, it is to be understood that the technical scope of the invention is not limited to that of the foregoing embodiments but applicable to all charge coupled devices as stated in the claims.

We claim:

1. A charge coupled semiconductor memory device comprising:

a semiconductor substrate;

an insulating film disposed on one surface of the substrate;

a series of metallic electrodes disposed on the surface of the insulating film;

means for introducing minority carriers into the substrate;

means for sequentially applying to the metallic electrodes a pulse electric field for transferring the minority carriers along the surface portion of the substrate in contact with the insulating film;

means for detecting the minority carriers thus transferred;

an impurity region doped with an impurity to form a deep energy level in the forbidden gap within the semiconductor substrate, said impurity region disposed at least immediately below the metallic electrodes and in the portion of the substrate where the minority carriers are to be stored in contact with the insulating film; and means connected to the metallic electrodes corresponding to the impurity region, for applying a pulse electric field capable of producing inversion regions in said substrate.

2. A charge coupled semiconductor memory device according to claim 1, wherein the means for sequentially applying to the metallic electrodes a pulse electric field for transferring the minority carriers consists of a time delay line connected to said metallic electrodes and means for applying a pulse electric field capable of producing depletion regions within said semiconductor substrate.

3. A charge coupled semiconductor memory device according to claim 1, wherein the impurity regions are disposed in the portions of the semiconductor substrate in contact with the insulating film and corresponding to all of the metallic electrodes.

4. A charge coupled semiconductor memory device according to claim 1, wherein the metallic electrodes are provided in sets of at least two for transferring the minority carriers.

5. A charge coupled semiconductor memory device according to claim 4, wherein the impurity regions are disposed in the portions of the semiconductor substrate in contact with the insulating film and immediately below one corresponding electrode of the individual sets of the metallic electrodes.

6. A charge coupled semiconductor memory device according to claim 3, wherein the metallic electrodes are provided in sets of three for transferring the minority carriers.

7. A charge coupled semiconductor memory device according to claim 6, wherein the means for applying a pulse electric field capable of producing inversion regions within the semiconductor substrate is connected to every third electrode of the individual sets of the electrodes.

8. A charge coupled semiconductor memory device according to claim 7, wherein the conductors for supplying the pulse electric fields to be applied to every third electrode for transferring the minority carriers are the same as the conductors for supplying the pulse electric fields to be applied to the electrodes for producing inversion regions within the semiconductor substrate, and further including switching means, connected to the means for applying the pulse field for transferring the minority carriers and the means for applying the pulse field capable of producing inversion regions within the semiconductor substrate, for selectively enabling the connection of a transferring pulse field or an inversion region producing field to said substrate.

9. A charge coupled semiconductor memory device according to claim 2, wherein the impurity regions are disposed in the portions of the semiconductor substrate in contact with the insulating film corresponding to each of the metallic electrodes.

10. A charge coupled semiconductor memory device according to claim 9, wherein the means for applying a pulse field capable of producing inversion regions within the semiconductor substrate and the means for applying a pulse field capable of producing depletion regions within the substrate are both connected to the time delay line via switching means.

11. A charge coupled semiconductor memory device according to claim 1, which further includes means for detecting the stored minority carriers.

12. A charge coupled semiconductor device according to claim 11, wherein the means for detecting the stored minority carriers comprises a second metallic electrode disposed corresponding to and in the vicinity of the metallic electrode corresponding to the impurity region, means for applying a pulse current for reading out the minority carriers which is connected in series between the metallic electrode and the corresponding second metallic electrode, and current detecting means.

13. A charge coupled semiconductor memory device according to claim 1, wherein the impurity region is disposed entirely over the surface of the semiconductor substrate in contact with the insulating film.

14. A charge coupled semiconductor memory device according to claim 1, wherein the semiconductor substrate is made of either Si or Ge and the impurity region contains an element selected from the group consisting of Au, Ag, Cu, Ni, Fe and Co.

15. A charge coupled semiconductor memory device according to claim 14, wherein the semiconductor substrate is made of Si and the impurity in the impurity region is Au.

16. A charge coupled semiconductor memory device according to claim 1, wherein the semiconductor substrate is made of GaAs and the impurity region contains an element selected from the group consisting of Au, Ag, Cu, Ni, Fe, Co and Cr.

17. A charge coupled semiconductor memory device according to claim 16, wherein the semiconductor substrate is made of GaAs and the impurity in the impurity region is Cr.

18. A charge coupled semiconductor memory device comprising:

a semiconductor substrate;

a layer of insulating material disposed on the surface of said substrate;

at least one electrode disposed on said layer of insulating material;

first means, coupled to said substrate, for introducing minority carriers into said substrate;

second means, coupled to said substrate and being spaced from said first means, with said at least one electrode disposed therebetween, for detecting minority carriers transferred along the surface portion of the substrate;

at least one impurity region, disposed in said substrate at least immediately below at least one electrode, and being doped with an impurity to form a deep energy level in the forbidden gap within the substrate;

third means, connected to said at least one electrode, for applying an electric field to said substrate having a strength sufficient to produce a depletion region therein; and fourth means, connected to said at least one electrode immediately below which said impurity region is disposed, for applying an electric field to said impurity region having a strength sufficient to produce an inversion region therein.

19. A charge coupled semiconductor memory device according to claim 18, wherein said third and fourth means are incorporated with each other.

20. A charge coupled semiconductor memory device according to claim 19, wherein said at least one electrode comprises a plurality of electrodes and said impurity region is disposed beneath at least one selected one of said electrodes.

21. A charge coupled semiconductor memory device according to claim 20, wherein said impurity region comprises a plurality of spaced apart regions respectively disposed beneath said plurality of electrodes.

22. A charge coupled semiconductor memory device according to claim 20, wherein said impurity region comprises a continuous impurity region extending along the surface of said substrate beneath each of said electrodes.

23. A charge coupled semiconductor memory device according to claim 22, wherein said first means comprises a light signal applying means, optically coupled to one surface of said substrate, for introducing minority carriers therein in accordance with the intensity of a light signal.

24. A charge coupled semiconductor memory device comprising:

a semiconductor substrate of a first conductivity type;

a layer of insulating material disposed on the surface of said semiconductor substrate;

a plurality of electrodes disposed on said layer of insulating material;

first means, coupled to said substrate, for introducing minority carriers into said substrate beneath at least one of said plurality of electrodes;

second means, coupled to said substrate and being spaced apart from said first means, with said plurality of electrodes disposed therebetween, for detecting minority carriers transferred along the surface portions of said substrate beneath said electrodes;

at least one semiconductor impurity region disposed in said substrate and extending to said surface, beneath at least one of the electrodes of said plurality, and being doped with an impurity to form a deep energy level in the forbidden gap; and third means, connected to at least one of said electrodes of said plurality, immediately below which said at least one semiconductor impurity region is disposed, for applying an electric field to said impurity region having a strength sufficient to produce an inversion region therein.

25. A charge coupled semiconductor memory device according to claim 24, further comprising fourth means, connected to at least one of said electrodes of said plurality, for applying an electric field to said substrate of a sufficient strength to form a depletion region therein.

26. A charge coupled semiconductor memory device according to claim 25, wherein said impurity region comprises a plurality of spaced apart regions respectively disposed beneath said plurality of electrodes.

27. A charge coupled semiconductor memory device according to claim 25, wherein said impurity region comprises a continuous impurity region extending along the surface of said substrate beneath each of said electrodes.

* * * * *